March 31, 1970 C. A. ALLEN 3,504,340

TRIPLE ERROR CORRECTION CIRCUIT

Filed May 8, 1967 3 Sheets-Sheet 1

INVENTOR
CHARLES A. ALLEN

BY W. S. Robertson

ATTORNEY

FIG. 3

15,5,3 DECODING $A = M(P_{14} \veebar P_{10}, P_1 \veebar E_1, P_5 \veebar P_2, P_8 \veebar P_4, P_9 \veebar P_3, P_{11} \veebar P_6, P_{13} \veebar P_7)$ $B = M(P_2 \veebar E_1, P_5 \veebar P_1, P_6 \veebar P_3, P_{10} \veebar P_4, P_{11} \veebar P_9, P_{12} \veebar P_7, P_{14} \veebar P_8)$ $C = M(P_3 \veebar E_1, P_6 \veebar P_2, P_7 \veebar P_4, P_9 \veebar P_1, P_{11} \veebar P_5, P_{12} \veebar P_{10}, P_{13} \veebar P_8)$ $D = M(P_4 \veebar E_1, P_7 \veebar P_3, P_8 \veebar P_1, P_{10} \veebar P_2, P_{12} \veebar P_6, P_{13} \veebar P_9, P_{14} \veebar P_5)$ $E = M(E_1, P_1 \veebar A, P_2 \veebar B, P_3 \veebar C, P_4 \veebar D, P_5 \veebar P_6 \veebar P_9, P_{11} \veebar P_{14} \veebar P_7)$

FIG. 2

15, 5,3 CODE $E_1 = E$ $P_1 = A \veebar E$ $P_2 = B \veebar E$ $P_3 = C \veebar E$ $P_4 = D \veebar E$ $P_5 = A \veebar B \veebar E$ $P_6 = B \veebar C \veebar E$ $P_7 = C \veebar D \veebar E$ $P_8 = D \veebar A \veebar E$ $P_9 = A \veebar C \veebar E$ $P_{10} = B \veebar D \veebar E$ $P_{11} = A \veebar B \veebar C \veebar E$ $P_{12} = B \veebar C \veebar D \veebar E$ $P_{13} = A \veebar C \veebar D \veebar E$ $P_{14} = A \veebar B \veebar D \veebar E$

FIG. 4

15,5,3 CODE

| DE \ ABC | 000 | 001 | 011 | 010 | 110 | 111 | 101 | 100 |
|---|---|---|---|---|---|---|---|---|
| 00 | | | | | | | | |
| 10 | | | | | | | | |
| 11 | DE | CDE | BCDE | BDE | ABDE | | ACDE | ADE |
| 01 | E | CE | BCE | BE | ABE | ABCE | ACE | AE |

FIG. 6

14,4,3 DECODING $$A = M(A_1, P_1 \forall B_1, P_4 \forall D_1, P_5 \forall C_1, P_7 \forall P_2, P_9 \forall P_3, P_{10} \forall P_6)$$

$$B = M(B_1, P_1 \forall A_1, P_2 \forall C_1, P_6 \forall D_1, P_7 \forall P_5, P_8 \forall P_3, P_{10} \forall P_4)$$

$$C = M(C_1, P_2 \forall B_1, P_3 \forall D_1, P_5 \forall A_1, P_7 \forall P_1, P_8 \forall P_6, P_9 \forall P_4)$$

$$D = M(D_1, P_3 \forall C_1, P_4 \forall A_1, P_6 \forall B_1, P_8 \forall P_2, P_9 \forall P_5, P_{10} \forall P_1)$$

FIG. 7

13,3,3 DECODING $$A = M(A_1, A_2, P_1 \forall B_1, P_2 \forall B_2, P_5 \forall C_1, P_6 \forall C_2, P_7 \forall P_3)$$

$$B = M(B_1, B_2, P_1 \forall A_1, P_2 \forall A_2, P_3 \forall C_1, P_4 \forall C_2, P_7 \forall P_5)$$

$$C = M(C_1, C_2, P_3 \forall B_1, P_4 \forall B_2, P_5 \forall A_1, P_6 \forall A_2, P_7 \forall P_1)$$

FIG. 5

14,4,3 CODE $A_1 = A$ $B_1 = B$ $C_1 = C$ $D_1 = D$ $P_1 = A \forall B$ $P_2 = B \forall C$ $P_3 = C \forall D$ $P_4 = D \forall A$ $P_5 = A \forall C$ $P_6 = B \forall D$ $P_7 = A \forall B \forall C$ $P_8 = B \forall C \forall D$ $P_9 = C \forall D \forall A$ $P_{10} = D \forall A \forall B$

FIG. 8

13,3,3 CODE $A_1, A_2 = A$ $B_1, B_2 = B$ $C_1, C_2 = C$ $P_1, P_2 = A \forall B$ $P_3, P_4 = B \forall C$ $P_5, P_6 = C \forall A$ $P_7 = A \forall B \forall C$ United States Patent Office 3,504,340

Patented Mar. 31, 1970

3,504,340

TRIPLE ERROR CORRECTION CIRCUIT

Charles A. Allen, Poughkeepsie, N.Y., assignor to International Business Machines Corporation, Armonk, N.Y., a corporation of New York Filed May 8, 1967, Ser. No. 636,691
Int. Cl. H03k *13/34*; H04l *1/10*
U.S. Cl. 340—146.1 8 Claims

ABSTRACT OF THE DISCLOSURE

Error correcting circuit for digital equipment, particularly a circuit operating in a 15, 5, 3 error correcting code (and variations that give 14, 4, 3 and 13, 3, 3 codes). Data is encoded by means of Exclusive OR and is decoded by means of Exclusive OR circuits and majority logic circuits with feedback from outputs of the majority logic circuits to the decoding Exclusive OR circuits.

INTRODUCTION TO ERROR CORRECTING CODES

An introductory description of known error correcting codes and components of error correcting circuits will be helpful in understanding the invention and the terminology that will be used in this description. In a data processing system, the electrical signals that represent the logical 1 and 0 bits in a word of data are handled by components that may introduce errors in the data. A logical 1 may be received incorrectly as a 0 and vice versa. Most data processing apparatus is provided with circuits for detecting such errors and some apparatus is provided with circuits for correcting the errors. An object of this invention is to provide a new and improved error correcting circuit.

A memory storing many bits is an example of a particularly useful application of this invention. A memory may develop individual bad components, or it may be constructed by a batch fabrication technique that leaves some bad storage regions. In a memory without error correcting, the individual bad bit positions or the bad regions of a batch fabricated memory must in some way be isolated from the operating components. In an operating device it is of course undesirable to stop the operation for repair when a bad bit position is detected; it is preferable to continue normal operation in spite of the bad bit positions. In a manufacturing process it is usually undesirable to wire each memory according to its unique pattern of good and bad storage positions; it may be preferable to construct the memory to operate in an error correcting code. Other advantageous applications of error correcting codes are well known.

A simple form of error detection in a memory or other data processing apparatus can be provided by duplicate storage locations for each bit. An error that occurs in only one position can be detected as a mismatch between correcting bits of the word. If 3 or more positions are provided for each bit, it is possible to correct errors; if an error occurs in only one position, the correct value can be recognized from the 2 valid bits for the same position. To generalize, when a bit is produced an odd number of times, errors that occur in one fewer than half the number of bits can be detected by accepting the majority value as correct. Of course, when more than half of the bits are incorrect, the error will be uncorrected.

All error correcting systems use the concept of dutplicating data bits; however the arrangement of simply transmitting the same bit over and over is seldom used because more efficient systems have been devised. These systems are called codes because the original data bits are encoded to generate a longer word (which will be called a message) in which some of the bits are functions of several data bits. The information of each data bit appears in several of the message bits. The message is decoded to form data bits in a way in which an error in one bit of the message can be detected or corrected from information in other data bits.

Error correcting codes are commonly identified by 3 numbers that can be generalized as $n$, $k$, $t$. These terms define, respectively, the number of message bits, the number of data bits, and the number of errors that can be detected in each message block. For example in the 15, 5, 3 code that will be described, a message of 15 bit positions represents 5 data bits, and errors in any 3 of the 15 message bits can be corrected.

Many error correcting codes can be explained in terms of the well known parity check circuit which detects but does not correct errors. In a parity check system, an extra bit is added to the data word to signify whether there is an odd number (or an even number) of 1's in the data word. If any single one of these bits is changed, the parity (the relationship between the number of 1's and the number of 0's) is changed. Such an error can be detected at a receiving station by a parity check on the message bits. For error correcting, several parity bits can be provided to each give a parity check on a different group of the data bits. These parity checks are overlapped in a way that causes an error in any one of the data or parity bits to produce a unique pattern in the parity bits. Thus the pattern of parity bits, called a syndrome, can be interpreted as the address of the bit that is to be changed to correct the message.

A system for correcting a single error can be arranged to have the syndrome represent a binary number that identifies the error position in the message. For example, the syndrome 0101 could signify that the fifth bit of the message is incorrect. To correct the error, the register holding this bit would be triggered to reverse its output. Circuits for triggering a particular register stage from such an address are fairly simple to design and construct. By contrast, locating an error in a multiple error correcting circuit has required complex circuitry because the syndromes do not define the error locations in any easily recognizable form. The complexity can be recognized from the fact that for the 15, 5, 3 code that will be described later, there would be $2^{10}=1,024$ syndromes. Some prior art circuits have included a table of the syndromes. During an error correction routine the location of the incorrect bits is looked up in the table. A general object of this invention is to provide an improved decoder that requires significantly fewer circuits than the known prior art error correcting circuits.

INTRODUCTION TO ERROR CORRECTING CIRCUITS

Well known threshold logic circuits are useful for selecting the binary value represented by a majority of several message bits. A threshold circuit has an input network that combines the inputs according to the sum of their amplitudes. It has a binary output and is constructed to remain at a 0 signifying output state when the sum of the input amplitudes is below a preset threshold and to switch to a 1 signifying state when the amplitude crosses the threshold. A threshold circuit that responds to any majority of its inputs is called a majority circuit. The majority logic function can also be implemented by circuits that perform AND, OR, and Invert logic functions.

Exclusive OR circuits, sometimes called quarter adders or modulo 2 adders, are used extensively in error detecting and error correcting. In this description the symbol $\veebar$ signifies the Exclusive OR function; thus, $$A \veebar B = \overline{A} + \overline{B}$$

A characteristic of the Exclusive OR operation that is useful in error correcting circuits is that the Exclusive OR function of two equal variables is 0; thus $$A \veebar A = 0$$

The Exclusive OR function is conventionally provided by special purpose circuits or by interconnections of basic AND, OR, INVERT logic blocks.

INTRODUCTION TO THE INVENTION

In the embodiment of the invention that operates in a 15, 5, 3 code, the circuit receives 5 data bits and produces a 15 bit message word. In the message word, 4 of the 5 data bits each appear in 7 complex functions. For example, in one message bit, data bits A and E are combined in the form $A \veebar E$. For each of the 7 message bits associated with any one of these 4 data bits, There is an independent message bit that contains all of the data bits except the particular bit that is to be decoded. Pairs of message bits are combined in Exclusive OR circuits that strip away the data bits that appear twice and produce the single data bit that appears only once. For example, one of the message bits is $$A \veebar B \veebar D \veebar E$$

a single message bit containing information about 4 data bits. Another message bit is $$A \veebar D \veebar E$$

The two bits are combined in an Exclusive OR circuit to produce the output $$(A \veebar B \veebar D \veebar E) \veebar (A \veebar D \veebar E) = B$$

If the two inputs are correct, the output B is correct. Six other pairs of message bits are combined to produce other independent functions of data bit B. These 7 independently developed terms are applied to a majority circuit. If no more than 3 of the message bits are incorrect, the majority of the inputs will be correct and the output, B, will be correct.

The 15 message bits are preselected functions of the 5 input variables such that 4 of the terms can be decoded as the term B was decoded in the example in the preceding paragraph. The message bits are encoded by Exclusive OR circuts, as will be explained in detail later.

One of the terms, E, appears in each message bit. Thus the E terms cannot be isolated by combining pairs of message bits. One of the message bits is the isolated term E, which is suitable as an input to the associated majority logic circuit. Four functions of E are generated by pairing the decoded data outputs A, B, C, and D with the appropriate message bits that are functions of these terms and E. Two functions of E are generated by Exclusive OR circuits that each receive three message bits. Since these message bits contain the term E an odd number of times, E appears in the output. These message bits are selected to have each other term appear twice in the inputs so that they cancel in the output. Thus the majority logic circuit for the data output bit E receives 7 independent functions of the term E and the output is correct so long as not more than 3 of the inputs are incorrect.

The circuit operates in a particularly useful code and it substantially simplifies the decoding circuitry as compared with known prior art error correcting circuits.

A 14, 4, 3 code and a 13, 3, 3 code can be developed from the 15, 5, 3 code that has been described.

The foregoing and other objects, features and advantages of the invention will be apparent from the following more particular description of preferred embodiments of the invention, as illustrated in the accompanying drawings.

THE DRAWING

FIG. 2 is a table showing the construction of the encoder of the circuit of FIG. 1.

FIG. 3 is a table showing the construction of the decoder of FIG. 1.

FIG. 4 is a Karnaugh map that presents the information of FIGS. 2 and 3 in a different form.

FIG. 5 is an encoder table for the 14, 4, 3 code.

FIG. 6 is the decoder table for the 14, 4, 3 code.

FIG. 7 is the decoder table for the 13, 3, 3 code.

FIG. 8 is the encoder table for the 13, 3, 3 code.

THE CIRCUIT OF FIG. 1

Figure 1:
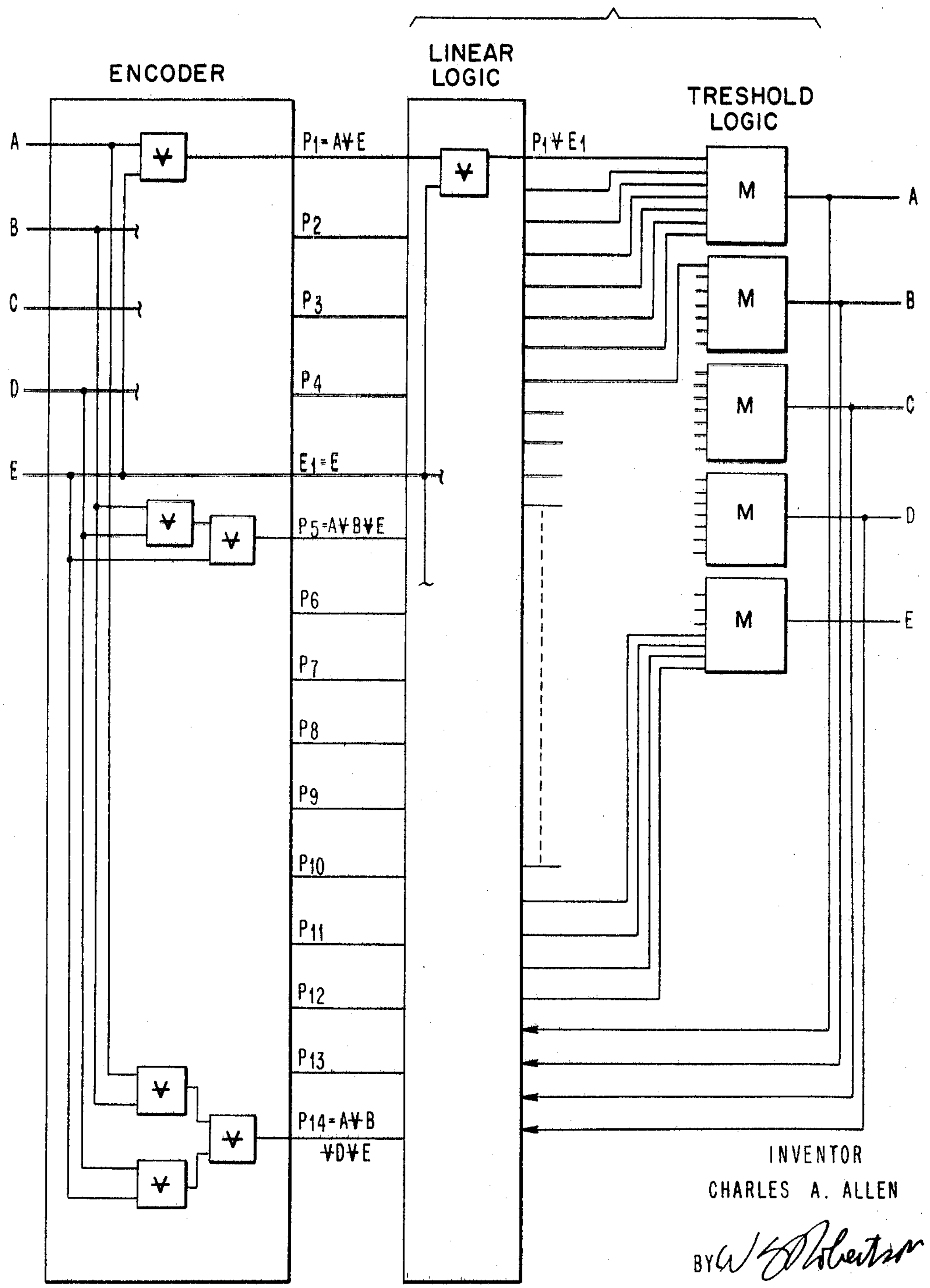
FIG. 1 shows the error correcting circuit of this invention adapted to operate in a 15, 5, 3 code.

FIG. 1 shows the error correcting circuit of this invention constructed to operate in a 15, 5, 3 code. The 5 data bits, designated A, B, C, D, and E, appear as inputs on the left side of the figure and as outputs on the right side of the figure. The circuit includes an encoder that encodes the 5 data input bits to form 15 message bits. The circuit also includes a decoder that converts the 15 message bits to the 5 data output bits. The decoder includes a threshold logic section that produces the data output bits and a linear logic section that operates on the message bits to form appropriate inputs to the threshold circuits. (The term "linear logic" distinguishes circuits such as the Exclusive OR circuits already mentioned from threshold logic circuits.)

In the example in which the error correcting circuit is used in a memory, the 5 data input bits are held in a data register of the memory or of apparatus associated with the memory. During a write operation, the encoder encodes the 5 data bits to supply the 15 message bits to circuits that write the message into a 15 bit location of the memory. During a read operation, the memory circuits supply a 15 bit message to the decoder and the decoder supplies the 5 data bits to a register of the memory or associated apparatus. Errors can be introduced by bad storage locations in the memory, by defective circuits for reading and writing in the memory, and by defective components of the error correcting circuit. The decoder corrects errors in the message so long as there are not more than three incorrect bits.

As will be understood from the detailed description of the circuit, the circuit is constructed to localize the effect of bad components in the encoder and decoder. Preferably each component circuit of the encoder is associated with a single message bit and each componet circuit of the linear logic section of the decoder is associated with a single input to a majority logic circuit. Thus the effect of a bad component in the encoder or the linear logic section is the same as an error in the massage and can be corrected in the same way that the circuit corrects errors in the message. Of course, incorrect data at the decoder input cannot be corrected by the circuit of this invention; it may desirable to add error detecting or correcting bits to the data word as it is handled by the circuits that supply the inputs and receive the outputs of the circuit of FIG. 1.

FIG. 1 shows representative circuits of the encoder and the decoder. One of the input data bits, E, is connected to appear as an isolated term on one of the encoder output lines. This line is labeled $E_1=E$. (In other codes that will be described later, an isolated data bit may appear as two or more message bits and the number substcripts help to distinguish these independent messages bits.) The other outputs of the encoder are each a function to two or more data bits and are designated $P_1$ through $P_{14}$. FIG. 1 shows an Exclusive OR circuit that is connected to receive input data bits A and E and to produce the message bit $$P_1 = A \veebar E$$

FIG. 1 also shows the detailed circuits for producing the message bits $$P_5 = A \veebar B \veebar E \text{ and } P_{14} = A \veebar B \veebar D \veebar E$$

These circuits and other circuits indicated only by output lines of the encoder are shown in the table of FIG. 2 and are shown in a somewhat different form in FIG. 4.

The linear logic section of the decoder is constructed to receive the 15 message bits and to form 35 single variable terms, 7 for each of the 5 output bits. The linear logic section also receives the data output bits which are used in decoding the term E. FIG. 1 shows in detail an Exclusive OR circuit that operates on the message bits $E_1$ and $P_1$. This circuit produces the output $$E_1 \veebar P_1$$

which can be expanded to the following expression to show the relation to the input data bits:

$$(E_1 = E) \veebar (P_1 = A \veebar E)$$

Since E appears twice and A appears once, the expression simplifies to A if these bits of the message are correct and the equalities in the expression are in fact true.

Other circuits that are indicated in the linear logic section of FIG. 1 by the output lines combine functions of A and functions not including A and produce 6 other outputs that equal the data input bit A unless an error has occurred in the message. These 7 outputs are applied to a majority logic circuit that is arranged to provide the data output bit A. If not more than 3 of the message bits are incorrect, the data output A will be correct.

Thus FIG. 1 illustrates the structure and the general operation of 15, 5, 3 error correcting circuit. The circuit is shown in detail in FIGS. 2, 3, and 4. FIG. 2 is a table of the complete relationship between the data bits that are inputs to the encoder and the message bits that are encoder outputs. The relationship of FIG. 2 to FIG. 1 will be recognized from the terms which appear in both figures, $$P_1 = A \veebar E,\ E_1 = E,\ P_5 = A \veebar B \veebar E, \text{ and } P_{14} = A \veebar B \veebar D \veebar E$$

By well known logic design techniques illustrated in FIG. 1, the encoder is constructed to provide the logic operations shown in FIG. 2.

FIG. 3 shows the relationship between the message bits, the outputs of the linear logic section, and the data output bits. The term M in FIG. 3 signifies the operation of a majority logic circuit on the terms bracketed to the right of the term M. The terms in the brackets show how the 15 message bits and 4 of the 5 data output bits are combined in the linear logic section to produce inputs to the majority circuits. The relationship of FIG. 3 to FIG. 1 is illustrated by the term $$P_1 \veebar E_1$$

which appears in both figures.

The Karnaugh map of FIG. 4 provides a readily understandable explanation of how the logic functions of the encoder and the decoder are selected. In the map the column headings correspond to the ways that data bits A, B, and C can be used as isolated terms of a message bit, or combined in a complex term, or omitted from message bits that are functions of data bits E or D. The row headings similarly show combinations of data bits D and E, and the spaces of the map correspond to the various combinations of all the data bits. For example, the space at the intersection of column 100 and row 01 corresponds to the Exclusive OR function $$A \veebar E$$

and the terms A and E are written in this space.

In a Karnaugh map, the column and row headings are arranged so that the terms in adjacent spaces in the same row or column differ by only a single variable. Consequently, adjacencies on the map are appropriate terms to combine in an Exclusive OR function to produce a single variable. (The concept of adjacencies is somewhat broader than physically adjacent spaces.) For example the term B changes between the physically adjacent columns 001–011 and 111–101 and between the physically separate adjacencies 010–000 and 110–100. In the map of FIG. 4 the term B appears 7 times and for each occurrence there is an adjacent term that contains all the terms except B. As FIG. 4 shows, data bits A, C, and D similarly appear in 7 (and only 7) message bits and other adjacent message bits are provided for deriving the data bits from the message bits by means of the two input Exclusive OR circuits illustrated in FIG. 1.

The two partially filled rows of the map provide no adjacencies for decoding E in the direct way that A, B, C, and D are decoded. The data output bits A, B, C, and D, which are supplied to the linear logic section, can be thought of as filling 4 spaces in the map that are respectively adjacent the message bits $$A \veebar E,\ B \veebar E,\ C \veebar E, \text{ and } D \veebar E$$

These adjacent pairs are combined in Exclusive OR circuits of the linear logic section to provide 4 inputs to the majority logic circuit for the E output bit.

Since the data bits A, B, C, and D are correct (within the limits of the circuit), some of the message bits that are used to decode A, B, C, and D are also used to decode the E, and an error in one of these message bits would appear as only a single error at the threshold input of the circuit for bit E. For example, suppose that message bit $$P_1 = A \veebar E$$

is incorrect; although this message bit is used to decode each of data bits A, B, C, and D it would cause only one error in the inputs to the threshold logic circuit for output data bit E. The threshold logic circuits for the other output bits isolate the components associated with bit E from the error in the other outputs of the linear logic section.

To other inputs to the majority logic circuit for data bit E are each formed from three message bits. One of these inputs is $$P_5 \veebar P_6 \veebar P_9 = (A \veebar B \veebar E) \veebar (B \veebar C \veebar E) \veebar (A \veebar C \veebar E)$$

(See FIGS. 2 and 3.) The term E appears an odd number of times and thereby appears in the output; the other terms each appear an even number of times and thereby cancel. In the other input, the terms $$C \veebar D \veebar E,\ A \veebar B \veebar C \veebar E \text{ and } A \veebar B \veebar D \veebar E$$

similarly simplify to E.

THE 14, 4, 3 CODE OF FIGS. 5 AND 6

The circuit of FIG. 1 can be modified to operate in a 14, 4, 3 code. The circuit for the 14, 4, 3 code is generally similar to the circuit of FIG. 1 except that it operates with 4 data bits and 14 message bits. The structure of the encoder is shown in the table of FIG. 5. FIG. 5 is related to FIG. 1 in the same way that FIG. 2 is related to FIG. 1. The decoder is constructed according to the table of FIG 6. As FIG. 6 shows, every possible combination of the 4 data bits, except $$A \veebar B \veebar C \veebar D$$

appears in the 14 message bits. Each data bit appears in 7 message bits and each of the complex message bit terms has an adjacency available for decoding. Consequently, the 7 inputs to each of the 4 majority logic circuits can be generated directly from message bits without feedback from the data output bits as in the 15, 5, 3 code and without combining more than two message bits for any input to a majority logic circuit.

The relationship of the 14, 4, 3 code to the 15, 5, 3 code can be seen from FIG. 4; the 14, 4, 3 code can be formed by removing the E terms from the row headings and the map spaces. The triple error correction feature is preserved because the remaining terms each still appear 7 times and adjacencies are available for decoding the complex terms.

THE 13, 3, 3 CODE OF FIGS. 7 AND 8

As the circuit of FIG. 1 is adapted to operate in a 13, 3, 3 code it receives 3 data bits and produces 13 message bits. The 13, 3, 3 code can be formed by eliminating the D terms in the 14, 4, 3 code. Some of the terms appear twice and are distinguished by the number subscripts which were introduced in the description of the 15, 5, 3 code. For example the two terms $$P_1=A\veebar E \text{ and } P_8=A\veebar D\veebar E$$

of the 15, 5, 3 code both simplify to A in the 13, 3, 3 code and are designated $A_1$ and $A_2$ to signify that they are independent message bits.

Thus a triple error correcting circuit has been disclosed that is operable in 3 useful codes and can be built without the complexity and multiple bit thereshold decoders of the known prior art.

The art of error correction and detection has been studied extensively and there are well known techniques by which the codes can be transformed to equivalent codes. As has already been mentioned, suitable circuit components are well known; threshold logic functions can be implemented in appropriate linear logic configurations and linear logic can be implemented in threshold logic circuits.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An error correcting circuit operating in an *n, k, t* code where *n* is greater than 12 and less than 16 and $k=n-10$, comprising, an encoder adapted to receive said data bits as inputs and constructed to produce *n* message bits that are predetermined linear logic functions of said data bits such that each data bit is encoded into 7 of the message bits and not more than one of said data bits is encoded into more than 7 of the message bits, and a decoder comprising a single threshold logic circuit for each of said data bits and adapted to produce said data bits as outputs and comprising a linear logic section connected to receive said message bits as inputs and to produce at the inputs of each of said threshold logic circuits 7 terms each corresponding, except for errors, to the associated input data bit, each said threshold logic circuits having a threshold level set to produce an output in response to a predetermined number of its 7 inputs.

2. An error correcting circuit according to claim 1 in which said threshold circuits respond to a majority of their inputs, whereby $t=3$.

3. An error correcting circuit according to claim 2 operating in a 15, 5, 3 code in which one of said data bits is encoded into every message bit and the linear logic section of the decoder performs the Exclusive OR operation on said message bits in groups of three bits that contain said one data bit an odd number of times and other data bits an even number of times.

4. An error correcting circuit according to claim 3 in which the linear logic section of the decoder further performs the Exclusive OR operation on a data output bit and message bits containing said one data bit and said data output bit.

5. An error correcting circuit according to claim 2 in which the code is 14, 4, 3 and each of the 4 data bits is encoded into 7 and only 7 message bits and said linear logic section performs the Exclusive OR operation on pairs of said message bits.

6. An error correcting circuit comprising, an encoder comprising Exclusive OR circuits connected to receive 5 data input bits designated A, B, C, D and E and interconnected to the following encoding function to provide the following 15 message bits,

| | |
|---|---|
| $E_1=E$ | $P_8=D\veebar A\veebar E$ |
| $P_1=A\veebar E$ | $P_9=A\veebar C\veebar E$ |
| $P_2=B\veebar E$ | $P_{10}=B\veebar D\veebar E$ |
| $P_3=C\veebar E$ | $P_{11}=A\veebar B\veebar C\veebar E$ |
| $P_4=D\veebar E$ | $P_{12}=B\veebar C\veebar D\veebar E$ |
| $P_5=A\veebar B\veebar E$ | $P_{13}=A\veebar C\veebar D\veebar E$ |
| $P_6=B\veebar C\veebar E$ | $P_{14}=A\veebar B\veebar D\veebar E$ |
| $P_7=C\veebar D\veebar E$ | |

a majority logic circuit for each of said 5 data bits adapted to provide data outputs, and a linear logic section comprising Exclusive OR circuits connected to receive said 15 message bits and to receive outputs of 4 of said majority logic circuits and interconnected according to the following decoding function to provide inputs to said majority logic circuits for decoding said message bits $$A=M(P_{14}\veebar P_{10},\ P_1\veebar E_1,\ P_5\veebar P_2,\ P_8\veebar P_4,\ P_9\veebar P_3,\ P_{11}\veebar P_6,\ P_{13}\veebar P_7)$$
$$B=M(P_2\veebar E_1,\ P_5\veebar P_1,\ P_6\veebar P_3,\ P_{10}\veebar P_4,\ P_{11}\veebar P_9,\ P_{12}\veebar P_7,\ P_{14}\veebar P_8)$$
$$C=M(P_3\veebar E_1,\ P_6\veebar P_2,\ P_7\veebar P_4,\ P_9\veebar P_1,\ P_{11}\veebar P_5,\ P_{12}\veebar P_{10},\ P_{13}\veebar P_8)$$
$$D=M(P_4\veebar E_1,\ P_7\veebar P_3,\ P_8\veebar P_1,\ P_{10}\veebar P_2,\ P_{12}\veebar P_6,\ P_{13}\veebar P_9,\ P_{14}\veebar P_5)$$
$$E=M(E_1,\ P_1\veebar A,\ P_2\veebar B,\ P_3\veebar C,\ P_4\veebar D,\ P_5\veebar P_6\veebar P_9,\ P_{11}\veebar P_{14}\veebar P_7).$$

7. An error correcting circuit comprising, an encoder comprising Exclusive OR circuits connected to receive 4 data input bits designated A, B, C and D and interconnected according to the following encoding function to provide 14 message bits,

| | |
|---|---|
| $A_1=A$ | $P_4=D\veebar A$ |
| $B_1=B$ | $P_5=A\veebar C$ |
| $C_1=C$ | $P_6=B\veebar D$ |
| $D_1=D$ | $P_7=A\veebar B\veebar C$ |
| $P_1=A\veebar B$ | $P_8=B\veebar C\veebar D$ |
| $P_2=B\veebar C$ | $P_9=C\veebar D\veebar A$ |
| $P_3=C\veebar D$ | $P_{10}=D\veebar A\veebar B$ |

a majority logic circuit for each of said data bits adapted to provide data outputs, and a linear logic section comprising Exclusive OR circuits connected to receive said 14 message bits and interconnected according to the following decoding function to provide inputs to said majority logic circuits for decoding said message bits.

$$A=M(A_1,\ P_1\veebar B_1,\ P_4\veebar D_1,\ P_5\veebar C_1,\ P_7\veebar P_2,\ P_9\veebar P_3,\ P_{10}\veebar P_6)$$
$$B=M(B_1,\ P_1\veebar A_1,\ P_2\veebar C_1,\ P_6\veebar D_1,\ P_7\veebar P_5,\ P_8\veebar P_3,\ P_{10}\veebar P_4)$$
$$C=M(C_1,\ P_2\veebar B_1,\ P_3\veebar D_1,\ P_5\veebar A_1,\ P_7\veebar P_1,\ P_8\veebar P_6,\ P_9\veebar P_4)$$
$$D=M(D_1,\ P_3\veebar C_1,\ P_4\veebar A_1,\ P_6\veebar B_1,\ P_8\veebar P_2,\ P_9\veebar P_5,\ P_{10}\veebar P_1).$$

8. An error correcting circuit comprising an encoder comprising Exclusive OR circuits connected to receive 3 data input bits designated A, B and C and interconnected according to the following encoding function to provide 13 message bits,

| | |
|---|---|
| $A_1,\ A_2=A$ | $P_3,\ P_4=B\veebar C$ |
| $B_1,\ B_2=B$ | $P_5,\ P_6=C\veebar A$ |
| $C_1,\ C_2=C$ | $P_7=A\veebar B\veebar C$ |
| $P_1,\ P_2=A\veebar B$ | |

a majority logic circuit for each of said data bits adapted to provide data outputs, and a linear logic section comprising Exclusive OR circuits connected to receive said 13 message bits and interconnected according to the following decoding function to provide inputs to said majority logic circuits for decoding said message bits $$A = M(A_1, A_2, P_1 \veebar B_1, P_2 \veebar B_2, P_5 \veebar C_1, P_6 \veebar C_2, P_7 \veebar P_3)$$

$$B = M((B_1, B_2, P_1 \veebar A_1, P_2 \veebar A_2, P_3 \veebar C_1, P_4 \veebar C_2, P_7 \veebar P_5)$$

$$C = M(C_1, C_2, P_3 \veebar B_1, P_4 \veebar B_2, P_5 \veebar A_1, P_6 \veebar A_2, P_7 \veebar P_1).$$

References Cited

UNITED STATES PATENTS

| | | | |
|---|---|---|---|
| 3,303,333 | 2/1967 | Massey | 235—153 |
| 3,398,400 | 8/1968 | Rupp et al. | 340—146.1 |
| 3,356,837 | 12/1967 | Raymond | 235—153 |
| 3,404,373 | 10/1968 | Srinivasan | 340—146.1 |

MALCOLM A. MORRISON, Primary Examiner

C. E. ATKINSON, Assistant Examiner

U.S. Cl. X.R.

235—153